Sept. 10, 1963    T. H. KORELITZ    3,103,545
GAS-LIQUID CONTACT APPARATUS
Filed Sept. 15, 1960

INVENTOR.
THEODORE H. KORELITZ
BY
Adams, Forward and McLean
ATTORNEYS

United States Patent Office

3,103,545
Patented Sept. 10, 1963

3,103,545
GAS-LIQUID CONTACT APPARATUS
Theodore H. Korelitz, Park Forest, Ill., assignor, by mesne assignments, to Sinclair Research, Inc., New York, N.Y., a corporation of Delaware
Filed Sept. 15, 1960, Ser. No. 56,141
7 Claims. (Cl. 261—114)

My invention relates to columns for effecting countercurrent contacting of a liquid and a vapor. In particular, my invention relates to a device for reducing the liquid loadings on the trays of such a column.

Generally, in an apparatus of this type the liquid flows from one tray over an overflow weir through a downcomer to the adjacent lower tray where a further weir provides a liquid seal and a uniform efflux of liquid. In order to overcome the flow resistance of the vapor pressure head in the column a certain pressure differential in the liquid downcomer is necessary; that is, the liquid in the downcomer stands at a higher level above the tray than the normal liquid level across the tray. The height of the liquid in the downcomer is dependent on the burden on the column and the vapor pressure above an individual tray. When the column is heavily burdened, it can easily occur that a downcomer becomes filled with liquid up to the level of the next higher tray, thus causing flooding and preventing the regular flow of the liquid from one tray to the next.

In any conventional column, the vapor and liquid loadings can vary substantially from one tray to another and in many instances higher loadings are required on some trays due to the nature of the process being carried out therein. In such cases, the design of the column, particularly the diameter of the column, is determined by the requirements of the heavily loaded trays, even though these may be relatively few in number in comparison to the number of trays with smaller loadings. Thus, a column of greater diameter and more expensive design is required to furnish the capacity demanded by a small number of trays. Furthermore, it is often found that existing columns are incapable of being converted to new services due to the inability of a few trays to handle the required loading. In many instances, columns of apparently adequate design are flooded by a transient increase in vapor and liquid loadings on one or a few trays.

It is the object of my invention to provide a device for reducing the liquid loadings on the trays of a column for effecting countercurrent contacting of a liquid and a vapor.

Briefly, my invention is an improvement in the structure of columns for effecting countercurrent contacting of a liquid and a vapor, in which such columns consist of a plurality of horizontally disposed vertically spaced trays, means for maintaining a minimum liquid level on each tray (such as an outlet weir) and a plurality of downcomers, wherein one downcomer receives liquid from a tray and admits such liquid to an adjacent lower tray and another downcomer receives liquid from the adjacent lower tray and admits such liquid to the next lower tray. More specifically, the apparatus for my invention includes the combination of an opening in the sidewall of a downcomer positioned below the point at which a liquid level in the downcomer causes flooding of the tower. Means are provided for preventing vapor flow into such openings and other means are provided for conducting liquid from the openings, bypassing the adjacent lower tray, to the next lower tray. Through the operation of the apparatus of my invention flooding of a column is prevented by permitting excess liquid in a downcomer to escape and bypass the adjacent lower tray. Thus, by preventing the flooding of a column, it becomes possible to employ a column of smaller diameter and less expensive design and to convert existing columns to new services. Columns of otherwise adequate design can also withstand transient increases in liquid and vapor loadings without impairment of overall efficiency.

Advantageously, the openings in the sidewall of the downcomers consist of a plurality of horizontally disposed slots located such that the lower edge of each slot is a distance below the point at which a liquid level in the downcomer causes flooding of the column which distance is at least equal to the height of aerated liquid in the downcomer equivalent to the total pressure drop of the vapors flowing from the adjacent lower tray to the adjacent upper tray. Further, the means for conducting the liquid from the openings in the sidewall of the downcomer can be either downwardly sloping open troughs or downwardly sloping closed troughs, such as pipes or conduits of various shapes. When employing open troughs, the means for preventing vapor flow into the openings can be flapper plate check valves and when employing closed troughs merely extending the outlet end below the liquid level in the next lower downcomer is sufficient to prevent vapor flow into the opening.

The apparatus of my invention is equally applicable to any of the well known columns used for effecting countercurrent contacting of a liquid and a vapor such as fractionating columns, rectifying columns, absorbing columns and scrubbing columns. Also, any of the well known types of trays, e.g., bubble cap, sieve, flexitray, etc., and all types of downcomer systems can be employed with the apparatus of my invention.

To illustrate more clearly my invention, reference is made to the attached drawing in which.

Figure 2:
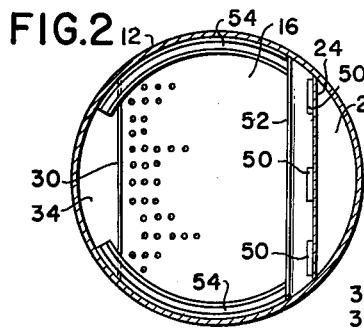
FIGURE 2 is a sectional view of the column taken along the line 2—2 of FIGURE 1.
Figure 1:
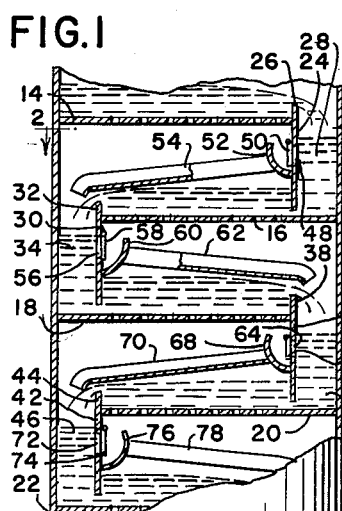
FIGURE 1 is a partially sectioned elevation of a fractionating column.

FIGURES 1 and 2 show a cylindrical column 10 having an outside wall 12 and a plurality of horizontally disposed, vertically spaced fractionating trays 14, 16, 18, 20 and 22 positioned one beneath the other as shown in FIGURE 1. To simplify the drawings, a sieve type tray having a plurality of holes extending therethrough is shown in all of the figures. Only one tray 16 is shown in FIGURE 2.

A vertical member 24 is disposed along a chord of cylindrical column 10 and extends from a point just above tray 14 to a point just above tray 16. The portion of vertical member 24 extending above tray 14 serves as an outlet weir 26 for tray 14 and the portion of vertical member 24 extending below tray 14 together with outside wall 12 of column 10 forms a downcomer 28 leading to tray 16. The exact position of vertical member 24 in relation to trays 14 and 16 is determined by the design criteria of the column. Although any type of downcomer system can be employed, a chord type system is shown in all the figures so as to simplify the drawings.

Similarly, another vertical member 30 is located at the diametrically opposite side of column 10 from member 24 and positioned in relation to trays 16 and 18, thereby providing an outlet weir 32 for tray 16 and a downcomer 34 leading to tray 18.

Vertical members 36 and 42 are located in the same manner as members 24 and 30, respectively, and are similarly positioned in relation to trays 18 and 20, and 20 and 22, respectively, thereby providing an outlet weir 38 for tray 18, a downcomer 40 leading to tray 20, an outlet weir 44 for tray 20 and a downcomer 46 leading to tray 22. Thus, downcomers 28, 34, 40 and 46 are located alternately on opposite sides of column 10.

The column 10 of FIGURES 1 and 2 as just described is a conventional type well known in the art and under normal operating conditions the liquid in the column flows across tray 14, over weir 26, through downcomer 28, across tray 16 over weir 32 through downcomer 34, etc. through the column.

Also shown in FIGURES 1 and 2 is an embodiment of my invention. A plurality of openings 48 are located in vertical member 24. Each of the openings 48 is provided with a vapor-tight flapper plate valve 50 hinged above opening 48 so as to open into the main portion of column 10 and away from vertical member 24 and downcomer 28. Attached to vertical member 24 is a horizontally disposed trough 52 of arcuate cross section positioned immediately below openings 48 on the side of member 24 facing the main portion of column 10. Connected to the opposite ends of trough 52 are downwardly sloping troughs 54 positioned along wall 12 and terminating above the downcomer 34. Thus, a liquid conducting means leading from downcomer 28 to downcomer 34 is provided by openings 48, trough 52 and troughs 54.

Similarly, a plurality of openings 56 are located in vertical member 30 and are provided with vapor-tight flapper plate valves 58. Another horizontally disposed trough 60 is positioned below openings 56 and connected at its opposite ends to downwardly sloping troughs 62 which terminate above downcomer 40.

In like manner, a plurality of openings 64 in vertical member 36 are provided with flapper plate valves 66 and horizontal trough 68 which connects with downwardly sloping troughs 70. Openings 72 in vertical member 42 are also provided with flapper plate valves 74, horizontal trough 76 and downwardly sloping troughs 78.

Figure 3:
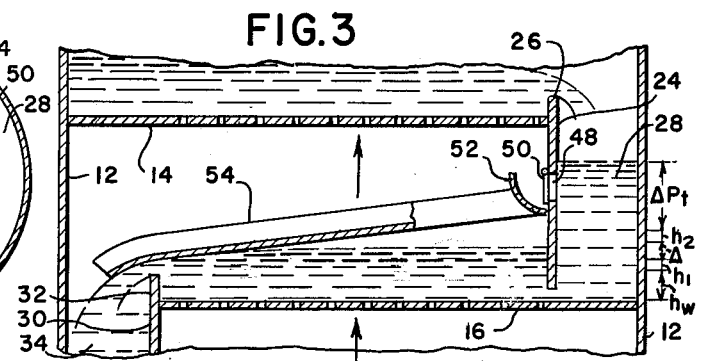
FIGURE 3 is an enlarged sectional elevation of the column showing normal operating conditions.

To illustrate more clearly the operation of my invention reference is made to FIGURE 3 which shows, for example, trays 14 and 16, vertical members 24 and 30, overflow weirs 26 and 32, downcomers 28 and 34, openings 48, flapper plate valves 50, horizontally disposed trough 52 and downwardly sloping troughs 54 positioned, as described above, within the wall 12. FIGURE 3 illustrates the operation of the column of my invention under normal conditions. The liquid flows across tray 14, over weir 26, through downcomer 28, across tray 16, over weir 32 and into downcomer 34. At the same time the vapor flow is upward as indicated by the arrows. Thus, the vapor passes through the holes in tray 16, is bubbled through the liquid on tray 16, flows upwardly to tray 14 where it passes through the holes in tray 14 and is bubbled through the liquid on tray 14.

To illustrate further the operation of my invention the height of the liquid in downcomer 28 is broken down into the various factors contributing to the head, to wit:

$h_w$ = height of weir
$h_1$ = head of liquid over weir
$\Delta$ = liquid gradient
$h_2$ = head due to flow under the downcomer
$S$ = liquid submergence
$\Delta P_0$ = pressure drop through dry tray Due to their inter-relationship, $\Delta P_0$ and $S$ have been combined into the term $\Delta P_t$ where:

$\Delta P_t = \Delta P_0 + S$ = total pressure drop across the tray

Thus,

Height of liquid in the downcomer = $\Delta P_t + h_2 + \Delta + h_1 + h_w$ as shown in FIGURE 3.

Under normal operating conditions, the flapper plate valves 50 are maintained in a closed position by the vapor pressure in the portion of the column between the surface of the liquid on tray 16 and the bottom of tray 14. This is due to the fact that under normal conditions the vapor pressure above the liquid on tray 16 is greater than the vapor pressure above the liquid on tray 14 plus the head of the liquid in downcomer 28 above opening 48.

Figure 4:
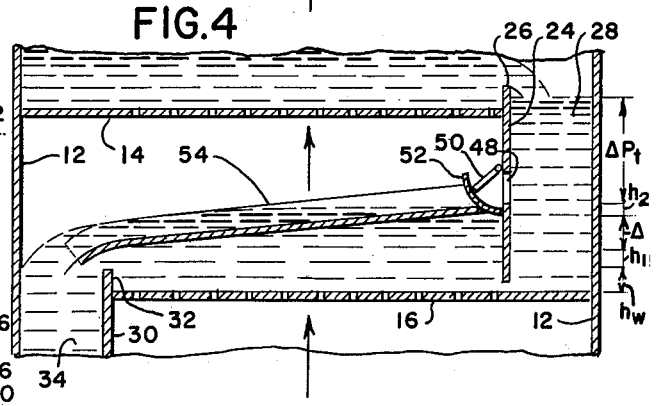
FIGURE 4 is an enlarged sectional elevation of the column showing flooding conditions.

FIGURE 4 shows the same elements of the column as illustrated in FIGURE 3. FIGURE 4 shows the operation of my invention under flooding conditions of the column. As can be seen in this figure, flapper plate valves 50, which exert substantially no resistance to fluid flow, are in the open position thereby permitting the liquid in downcomer 28 to flow through openings 48, into horizontal trough 52, downwardly sloping troughs 54 and thence into downcomer 34. In addition, there is also the normal liquid flow from downcomer 28 across tray 16, over weir 32 and into downcomer 34. As can be seen in FIGURE 4, the level of the liquid in downcomer 28 has risen to a height almost sufficient to cause flooding of the column. Actual flooding of the column however is prevented by the opening of valves 50 which permit a portion of the liquid in downcomer 28 to bypass tray 16 and be delivered to the next lower tray.

Flapper plate valves 50 have been opened due to the fact that the vapor pressure above tray 14 plus the head of the liquid in downcomer 28 above openings 48 exceeds the vapor pressure above tray 16. As a practical matter then, the openings 48 must be positioned below the point at which the liquid level in downcomer 28 would cause flooding of the column. Advantageously, the point below the flooding level which is selected for the openings 48 is equal to the height of liquid in downcomer 28 which is equal to the difference in vapor pressure above tray 16 and above tray 14. This head can also be equated to the total pressure drop across tray 16.

The height of the liquid in downcomer 28 is again broken down into various factors contributing to the head. As can be seen in FIGURE 4, the total pressure drop across the tray ($\Delta P_t$) and the liquid gradient ($\Delta$) have increased noticeably as flooding conditions have been approached. It will also be noted that the openings 48 have been positioned such that the height of the liquid in downcomer 28 above openings 48 equal to $\Delta P_t$ is reached prior to the point at which flooding of the column occurs. My invention thereby prevents flooding of the column.

Figure 5:
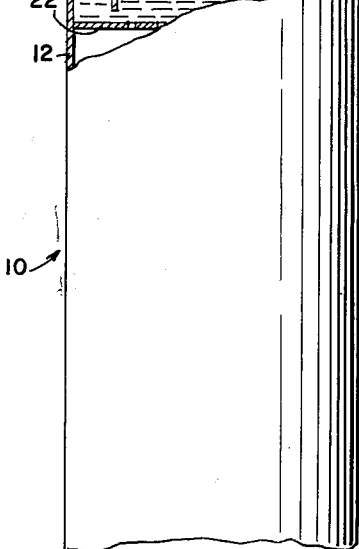
FIGURE 5 is an enlarged sectional elevation of the column showing an alternate embodiment of my invention.

FIGURE 5 illustrates an alternate embodiment of my invention which shows, for example, trays 14, 16, and 18, vertical members 24 and 30, overflow weirs 26 and 32, downcomers 28 and 34, openings 48 and 56, horizontally disposed troughs of semi-circular cross-section 52A and 60A, and downwardly sloping enclosed troughs 54A and 62A. With the exception of elements 52A, 54A, 60A and 62A, all the elements are positioned as described in the above paragraphs relating to FIGURES 1, 2, 3 and 4. Horizontally disposed troughs 52A and 60A, while being positioned in relation to openings 48 and 56 in the manner described previously, also completely enclose openings 48 and 56 and prevent communication with the vapor space above trays 16 and 18, respectively. Downwardly sloping enclosed troughs 54A and 62A continue the vapor-tight enclosure of openings 48 and 56. The downwardly sloping enclosed troughs 54A and 62A rather than terminating above the downcomers, as described above, are extended downwardly to a point below the normal liquid level in downcomers 28 and 34, respectively. By extending the lower end of downwardly sloping trough 54A below the normal liquid level in downcomer 34 a vapor-tight seal for opening 48 is provided. The operation of the apparatus shown in FIGURE 5, however, is essentially the same as that described for the apparatus of FIGURES 3 and 4.

As an alternative construction, the lower end of downwardly sloping trough 54A can be provided with a flapper plate valve 80, as shown in FIGURE 5. The flapper plate valve 80 is provided so as to prevent siphoning of the liquid from downcomer 34 in the event that the pressure differential between the vapor above trays 14 and 16 becomes sufficiently great.

While the attached drawing shows an embodiment of my invention associated with each of the downcomers of the column, the by-pass apparatus of my invention can be employed in combination with only one or some of the downcomers of a column. Thus, if it is known that a danger of flooding exists only at one point or section of a column, then only such downcomers need be provided with the by-pass apparatus of my invention.

I claim:

1. In a column for effecting countercurrent contacting of a liquid and a vapor including a plurality of horizontally disposed, vertically spaced trays, means for maintaining a minimum liquid level on each of said plurality of trays, and a plurality of generally vertically disposed downcomers, in which said downcomers are positioned relative to said trays such that a tray is provided with a first downcomer communicating at its lower end with the tray and a second downcomer communicating at its upper end with the tray wherein the first downcomer receives liquid from a tray and admits such liquid to an adjacent lower tray and the second downcomer receives liquid from said adjacent lower tray and admits such liquid to the next lower tray, the combination of at least one opening in the sidewall of the first downcomer positioned below the point at which a liquid level in the first downcomer causes flooding of the adjacent lower tray, means for preventing vapor flow into said opening, and means for conducting liquid from said opening, bypassing the adjacent lower tray, to the second downcomer; whereby flooding of the adjacent lower tray is prevented by permitting excess liquid in a downcomer to escape and bypass the adjacent lower tray.

2. In a column for effecting countercurrent contacting of a liquid and a vapor including a plurality of horizontally disposed, vertically spaced trays, means for maintaining a minimum liquid level on each of said plurality of trays, and a plurality of generally vertically disposed downcomers, in which said downcomers are positioned relative to said trays such that a tray is provided with a first downcomer communicating at its lower end with the tray and a second downcomer communicating at its upper end with the tray wherein one downcomer receives liquid from a tray and admits such liquid to an adjacent lower tray and another downcomer receives liquid from said adjacent lower tray and admits such liquid to the next lower tray, the combination of a plurality of horizontally disposed slots in the sidewall of the first downcomer, the lower edge of each said slot being located a distance below the point at which a liquid level in the first downcomer causes flooding of the adjacent lower tray at least equal to the height of aerated liquid in said first downcomer equivalent to the total pressure drop of the vapors flowing from the tray being considered to the adjacent upper tray, means for preventing vapor flow into said slots, and means for conducting liquid from said slots, bypassing the adjacent lower tray, to the second downcomer; whereby flooding of the adjacent lower tray is prevented by permitting excess liquid in a downcomer to escape and bypass the adjacent lower tray.

3. The apparatus of claim 1 in which the means for preventing vapor flow into said opening is a flapper plate check valve.

4. The apparatus of claim 1 in which means for conducting liquid from said opening to the second downcomer is a downwardly sloping open trough.

5. The apparatus of claim 1 in which means for conducting liquid from said opening to the second downcomer consists of a completely enclosed downwardly sloping trough having an inlet and outlet end, said inlet end being in vapor-tight connection with said opening and said means for preventing vapor flow into said opening consists of said completely enclosed trough with the outlet end thereof extending into the liquid in the second downcomer.

6. The apparatus of claim 4 in which said downwardly sloping trough is positioned along the column wall.

7. The apparatus of claim 5 in which said completely enclosed downwardly sloping trough is positioned along the column wall.

References Cited in the file of this patent

UNITED STATES PATENTS

| | | |
|---|---|---|
| 1,765,087 | Mase | June 17, 1930 |
| 2,078,288 | Sherman | Apr. 27, 1937 |
| 2,862,697 | Zuiderweg et al. | Dec. 2, 1958 |
| 2,902,413 | Kassel et al. | Sept. 11, 1959 |